C. E. BAUER.
BRAKE BEAM BALANCING MECHANISM.
APPLICATION FILED FEB. 15, 1918.
1,286,500.
Patented Dec. 3, 1918.
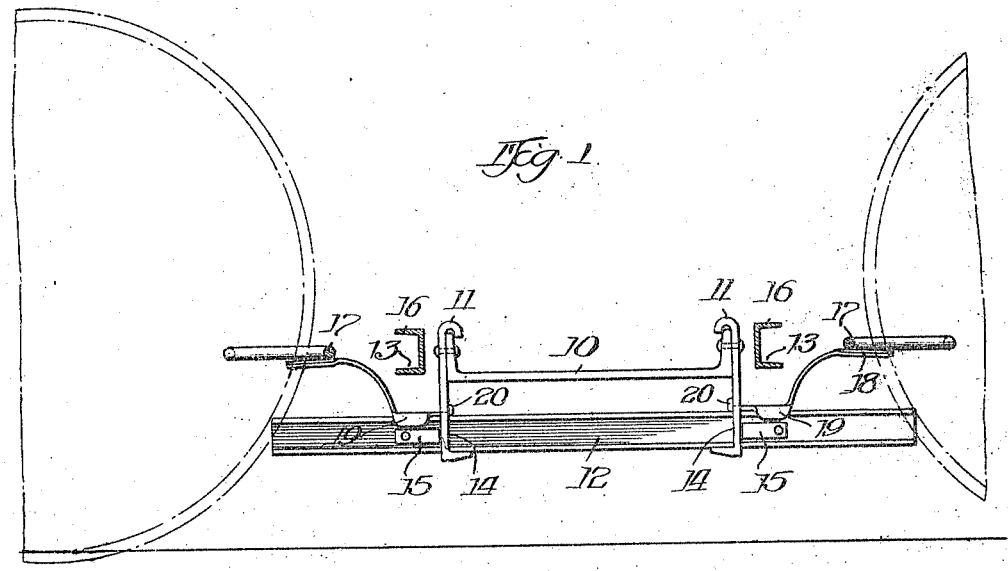
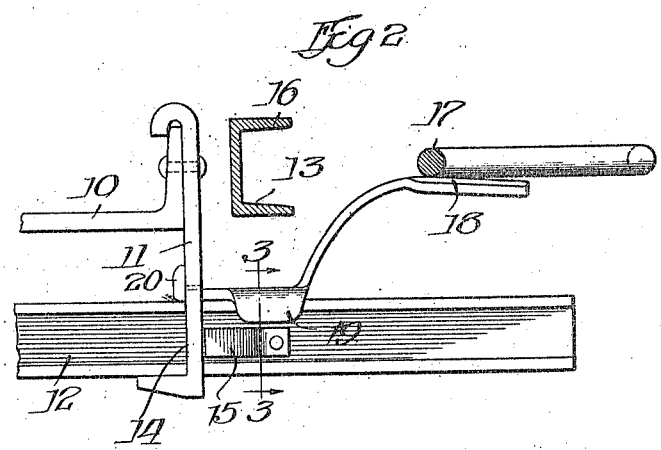
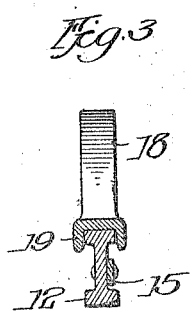
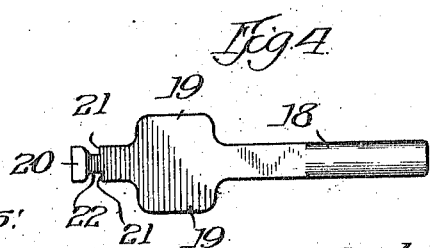
Witnesses:
Inventor
Carl Edward Bauer
By Wilkinson & Huxley
Attys

UNITED STATES PATENT OFFICE.

CARL EDWARD BAUER, OF HAMMOND, INDIANA, ASSIGNOR TO AMERICAN STEEL FOUNDRIES, OF CHICAGO, ILLINOIS, A CORPORATION OF NEW JERSEY.

BRAKE-BEAM-BALANCING MECHANISM.

1,286,500.  Specification of Letters Patent.  Patented Dec. 3, 1918.

Application filed February 15, 1918. Serial No. 217,295.

*To all whom it may concern:*

Be it known that I, CARL EDWARD BAUER, a citizen of the United States, residing at Hammond, in the county of Lake and State of Indiana, have invented certain new and useful Improvements in Brake-Beam-Balancing Mechanisms, of which the following is a specification.

This invention relates to brake beam balancing mechanism.

The object of the invention is to simplify and improve balancing mechanism for brake beams to provide an arrangement in which the various parts coöperate to produce good commercial results.

Generally speaking, this and other objects are accomplished by providing, in combination, a brake beam, a safety bar therefor, a support for the safety bar, and a leveling member for slidably receiving the brake beam and being mounted on the safety bar and locked to the support for the safety bar.

The invention is illustrated on the accompanying sheet of drawings, in which—

Figure 1 is a fragmentary side elevation of a railway car truck embodying my invention;

Fig. 2 is a fragmentary enlarged view showing my improved leveling arrangement with its associated parts;

Fig. 3 is a sectional view taken in the plane of line 3—3 of Fig. 2; and,

Fig. 4 is a plan view of the leveling member.

The various novel features of my invention will be apparent from the following description and drawings and will be particularly pointed out in the appended claims.

This invention is disclosed in connection with a railway car truck, including a spring plank 10, to the opposite sides of which are connected hangers 11 for supporting a horizontally arranged rigid safety bar 12, the ends of which underlie associated brake beams 13 for preventing the latter from falling to the tracks in the event that they become disconnected from their normal fastenings.

The safety bar 12 preferably passes through openings 14 in the hangers, and the safety bar is locked with respect to said hangers by spring clips 15, which are secured to the sides of the safety bar and the ends of which abut the hangers 11.

With the truss type of brake beam, having a compression member 16 and tension member 17, the brake beam hangers being connected to the heads at the ends of the brake beam, the tension members have a tendency to tilt downwardly. This downward tilting movement of the tension members, however, must be prevented in order that the brake shoes be maintained in concentricity with the braking surfaces of the associated wheels. In order, therefore, to level the brake beams, I have provided a leveling member, having a curved supporting portion 18 for slidably receiving the tension member 17 of the brake beam, whereby the brake beam will be held in its proper level position under all conditions, including braking and releasing movements. This leveling member is provided with laterally and downwardly turned ears 19 which embrace opposite sides of the safety bar to prevent lateral displacement of the leveling device. The end 20 of the leveling device adjacent the ears 19 passes through the openings 14 of its associated hanger on the top of the safety bar 12, this end 20 extending under the spring plank being bent upwardly to lock the leveling member with respect to its hangers 11 and safety bar 12. The leveling member is prevented from longitudinal movement by the coöperation of its upturned end 20 and shoulders 21 formed by a reduced portion 22 which occupies the upper portion of the aperture 14. This leveling device, which rests upon the safety bar, curves upwardly and finally terminates in the supporting portion 18 upon which the tension member 17 of the brake beam rides.

The leveling device preferably is of spring material to permit a certain degree of vertical movement of the beam in addition to the longitudinal movement during the application and release of the brakes. This arrangement is simple and effective, being adapted to meet the various requirements of the use for which it is designed.

It is my intention to cover all modifications of the invention falling within the spirit and scope of the following claims.

I claim:

1. In combination, a brake beam, a safety member therefor, a support for the safety member, and a leveling member for slidably receiving the brake beam and being mounted on the safety member and locked to the support for the safety member.

2. In combination, a brake beam, a safety bar therefor, a support for the safety bar, and a leveling member for supporting the brake beam mounted on the safety bar and locked to the support for the safety bar.

3. In combination, a brake beam, a safety bar underlying the same, a support for the safety bar, and a leveling member extending from said safety bar and its support and having a portion for slidably supporting the brake beam.

4. In combination, a brake beam, a safety bar underlying the same, and a leveling member having a portion for slidably receiving the brake beam and having ear portions for embracing the safety bar to prevent lateral movement of the leveling member.

5. In combination, a brake beam, a safety bar underlying the same, a support for the safety bar having an opening through which the safety bar extends, and a leveling member for slidably supporting the brake beam having a portion thereof extending through the aperture in said safety bar support whereby the leveling device is held in position.

Signed at Hammond, Ind., this 8th day of February, 1918.

CARL EDWARD BAUER.